(12) United States Patent
Mahmood

(10) Patent No.: US 8,886,137 B2
(45) Date of Patent: Nov. 11, 2014

(54) FREQUENCY TUNABLE TRANSMIT/RECEIVE (TX/RX) ANTENNA SWITCH

(71) Applicant: Raytheon Company, Waltham, MA (US)

(72) Inventor: Saadya Mahmood, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 225 days.

(21) Appl. No.: 13/665,656

(22) Filed: Oct. 31, 2012

(65) Prior Publication Data
US 2014/0120968 A1     May 1, 2014

(51) Int. Cl.
*H04B 1/44*     (2006.01)
*H04B 1/38*     (2006.01)

(52) U.S. Cl.
USPC ............................................ 455/83; 333/101

(58) Field of Classification Search
CPC .................................. H04B 1/48; H04B 1/44
USPC ..................................................... 455/78, 83
See application file for complete search history.

(56) References Cited

U.S. PATENT DOCUMENTS

| | | | |
|---|---|---|---|
| 4,169,252 | A | 9/1979 | Muszkiewicz |
| 5,166,857 | A | 11/1992 | Avanic et al. |
| 5,808,527 | A | 9/1998 | De Los Santos |
| 5,909,641 | A | 6/1999 | Simmons |
| 7,295,814 | B2 | 11/2007 | Yamashita et al. |
| 7,373,115 | B2 | 5/2008 | Monroe |
| 7,400,862 | B2 | 7/2008 | Domino et al. |
| 7,468,638 | B1 * | 12/2008 | Tsai et al. ..................... 331/126 |
| 7,512,388 | B2 | 3/2009 | Snider |
| 7,528,678 | B2 | 5/2009 | Tamura et al. |
| 7,885,614 | B2 | 2/2011 | Jedeloo |
| 8,204,031 | B2 | 6/2012 | Jian et al. |
| 2007/0049213 | A1 | 3/2007 | Tran |

OTHER PUBLICATIONS

Tanaka et al., "Frequency-Tunable PIN Diode Switch for Software Defined Radio," Otowave Laboratory Inc., 3-1 Hikari-no-oka, Yokosuka, Kanagawa, 239-0847, Japan,Yazaki Corporation, 1500 Mishuku, Susono, Shizuoka, 410-1194, Japan.

The PIN Diode Circuit Designers' Handbook, Microsemi Corp.— Watertown—580 Pleasnt Street; Watertown, MA 02472, 1998.

Kivekas et al.. "Frequency-Tunable Internal Antenna for Mobile Phones," Reprinted with permission from Proceedings of the 12émes Journées Internationales de Nice sur les Antennas, 12th International Symposium on Antennas (JINA 2002) Nice, France, Nov. 12-14, 2002, vol. 2, pp. 53-56.

(Continued)

*Primary Examiner* — Lee Nguyen
(74) *Attorney, Agent, or Firm* — Eric A. Gifford

(57) ABSTRACT

A frequency tunable transmit/receive (Tx/Rx) antenna switch uses a tuned PIN diode RF switch topology (e.g. shunt, series or series-shunt). Frequency tunability may be provided for either a transmit or a receive port (or both) that is tuned by a quarter-wavelength transmission line. The quarter-wavelength ($\lambda_c/4$) line establishes a passband centered about a center frequency $f_c$. An electronically tunable LC tank circuit adds capacitance to the switch impedance to shift the center frequency fc to lower frequencies and progressively narrow the passband with the addition of more capacitance. Transceiver units provided with frequency tunable Tx/Rx antenna switches can, for example, be used in a Master/Slave network in which multiple units communicate with each other or in an autonomous network in which each of the multiple units operate independently.

19 Claims, 9 Drawing Sheets

(56) References Cited

OTHER PUBLICATIONS

Buisman et al., ""Distortion-Free" Varactor Diode Topologies for RF Adaptivity," 2005 IEEE. Laboratory of High-frequency Technology & Components, 2Electronic Components, Technology and Materials, Delft University of Technology, Feldmannweg 17, 2628 CT, Delft, The Netherlands, 3University of California at San Diego UCSD, La Jolla, CA 92093 USA, pp. 157-160.

Entesari, Kamran, "Development of High Performance 6-18 GHz Tunable/Switchable RF MEMS Filters and Their System Implications," A dissertation submitted in partial fulfillment of the requirements for the degree of Doctor of Philosophy (Electrical Engineering) in The University of Michigan 2006.

Product Data Sheet for MSWSE-044-10 Silicon PIN Diode Switch Element, Aeroflex/Metelics, Inc. www.aeroflex.com/metelics, Revision Date: Nov. 2, 2009.

Brown et al., "A Varactor Tuned RF Filter," Submitted for Review as a Short Paper to the IEEE Trans. on MTT, Oct. 29, 1999, pp. 1-4.

Product Data Sheet, Technology Description YIG Tuned Filters, Micro Lambda Wireless, Inc., Micro Lambda Wireless, Inc.—46515 Landing Parkway, Fremont California 94538, 2012.

* cited by examiner

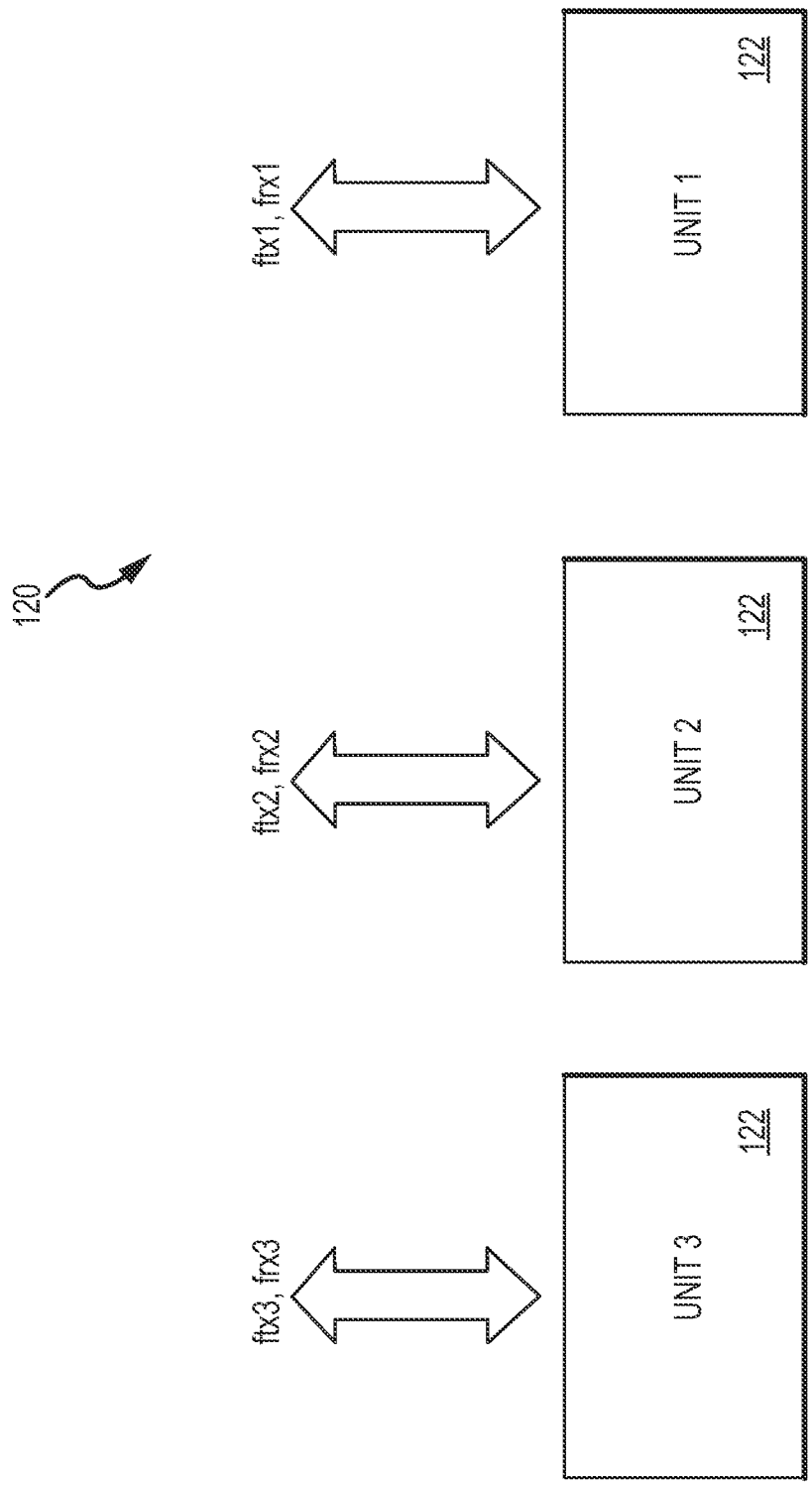

FREQUENCY TUNABLE TRANSMIT/RECEIVE (TX/RX) ANTENNA SWITCH

BACKGROUND OF THE INVENTION

1. Field of the Invention

This invention relates to transmit/receive (Tx/Rx) antenna switches, and more particularly to frequency tunable Tx/Rx antenna switch using a tuned PIN diode RF switch topology.

2. Description of the Related Art

Transmit/Receive (Tx/Rx) antenna switches are a class of tuned Single-Pole Double-Throw (SPDT) switches used by designers of communications transceivers to alternately connect the transceiver's antenna to either the transmitter or to the receiver. The antenna switch should provide high isolation and low insertion loss. Isolation is a measure of the RF power through the switch that is not transferred to the load. In other words, isolation is a measure of how effectively the switch is turned OFF. Isolation is calculated as the difference between the power measured at the switch output port with the switched biased ON and the power measured at the switch output port with the switch biased OFF. Insertion loss is the transmission loss through the switch. Insertion loss absorbs signal power.

A PIN (p-type-intrinsic-n-type) diode is a diode with a wide, lightly doped 'near' intrinsic semiconductor region between is p-type semiconductor and an n-type semiconductor region. The p-type and n-type regions are typically heavily doped because they are used for ohmic contacts. The wide intrinsic region is in contrast to an ordinary PN diode. The wide intrinsic region makes the PIN diode an inferior rectifier (one typical function of a diode), but it makes the PIN diode suitable for attenuators, fast switches, photodetectors, and high voltage power electronics applications.

The use of PIN diodes as the switching element in the Tx/Rx antenna switch is based on the difference between the PIN diode reverse and forward bias characteristics. At lower RF frequencies, f<2 GHz, the PIN diode appears to be a very small impedance under forward bias and a very large impedance under reverse bias. Most switch designs use a difference in reflection, rather than dissipation, to obtain switch performance. Very little power is dissipated by the PIN diode itself, thus permitting small devices to control relatively large amounts of RF power. The basic PIN diode switch is broadband. There are many different switch topologies e.g. shunt, series, series-shunt that use PIN diodes. The various topologies are detailed in CH. 2 PIN Diode RF Switches of The PIN Diode Circuit Designer's Handbook, Microsemi Corporation, 1998, which is hereby incorporated by reference.

The electrical performance (high isolation, low insertion loss) can be enhanced by inserting quarter-wavelength transmission lines between the antenna port and the PIN diodes. When ON, the antenna port sees a low loss quarter-wave transmission line. When OFF, the antenna port see a high loss (open) circuit. However, the bandwidth is now constrained to less than an octave. These switches are referred to as Tuned Switches. See FIG. 2.4 in CH 2 as an example of a Tuned Shunt SPDT Switch.

The Tx/Rx antenna switch typically uses a Tuned SPDT Switch topology for the improved electrical performance. FIG. 2.11 in CH 2 illustrates an embodiment of a Tx/Rx Antenna Switch in a Series-Shunt topology that uses a single quarter-wavelength transmission line to protect the receiver. Forward biasing the PIN diodes connects the transmitter to the antenna. The low impedance of PIN diode D1 that terminates the quarter-wavelength transmission line protects the receiver. Reverse biasing the PIN diodes, isolates the transmitter by the high reactance of PIN diode D1 and the quarter-wavelength line connects the receiver to the antenna.

FIG. 4 of U.S. Pat. No. 5,909,641 illustrates another embodiment of a Tx/Rx Antenna Switch in a Shunt topology that uses a pair of quarter-wavelength transmission lines to protect both the transmitter and the receiver. Forward biasing PIN diode 45 into a low-impedance state connects the antenna port to the transmitter. This low impedance is transformed into a high impedance at the antenna port the through quarter-wavelength transmission line 43. When diode 44 is forward biased into a low-impedance state, the antenna port is connected to the receiver port.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides frequency tunability for a Tx/Rx antenna switch using a tuned PIN diode RE switch topology (e.g. shunt, series or series-shunt). Frequency tunability may be provided for either a transmit or a receive port that is tuned by a quarter-wavelength transmission line. The quarter-wavelength line establishes a passband centered about an initial center frequency $f_c$. An electronically tunable LC tank circuit adds capacitance to the switch impedance to shift the center frequency $f_c$ to tower frequencies $f_{tx}$ or $f_{rx}$ and progressively narrow the passband with the addition or more capacitance. A single tank circuit at the antenna port can be used to frequency tune both the Tx and Rx ports or a pair of tank circuits can be used to independently tune the Tx and Rx ports.

In an embodiment, the electronically tunable LC tank circuit comprises a series connected fixed inductor and electronically-controlled variable capacitor and an electronic controller to set the capacitance value. For example, the variable capacitor may be a varactor diode whose capacitance changes with reverse bias voltage. The electronic controller comprises a series-connected controllable voltage source and RF choke connected in parallel with the LC network. In another example, the variable capacitor may be a switched capacitor bank. The electronic controller selectively opens and closes switches to the capacitor bank to set the capacitance value.

Transceiver units provided with frequency tunable Tx/Rx antenna switches can, for example. be used in a Master/Slave network in which multiple identical transceiver units communicate with each other or in an autonomous network in which each of the multiple units operate independently. In a Master/Slave network, the transmitter has a tuned quarter-wavelength line switch coupled to a tunable LC tank circuit to tune the transmit passband. When a transceiver unit becomes the "Master", the Master controls the tank circuit to add capacitance to shift the transmit passband to a lower frequency and to narrow the passband. The Master transmits at the lower frequency. The narrower passband attenuates the noise and harmonics associated with transmission to reduce interference at the Slave units. In an autonomous network, N transceiver units want to operate, transmit and receive, independently without interference. Both the transmit and the receive ports are tuned by a quarter-wavelength line and coupled to a tunable LC tank circuit to tune the transmit and receive passbands. Each unit's transmit and receive passbands are tuned to a different shifted center frequency. For example, unit 1 is tuned to 0.5 GHz and unit 2 is tuned to 0.8 GHz and unit 3 is tuned to 1.1 GHz. Units at relatively lower center frequencies (narrower passbands) will attenuate the noise of their transmissions as seen by units at higher center frequencies (wider passbands). Similarly unit at relatively lower center frequencies (narrower passbands) will attenuate the noise of transmission units at higher center frequencies (wider passbands). The overall effect is to isolate the transmission and reception of the N transceiver units to avoid interference.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 6a and 6b are diagrams of a pair of units having the same frequency tunable Tx/Rx antenna switch and the passband to facilitate independent operation of the units without interference.

DETAILED DESCRIPTION OF THE INVENTION

The present invention provides a frequency tunable Tx/Rx antenna switch using a tuned PIN diode RF switch topology (e.g. shunt, series or series-shunt in single, double or multi-throw). Frequency tunability may be provided for either a transmit or a receive port (or both) that is tuned by a quarter-wavelength transmission line. The quarter-wavelength ($\lambda_c/4$) line establishes a passband centered about a center frequency $f_c$. An electronically tunable LC tank circuit adds capacitance to the switch impedance to shift the center frequency fc to lower frequencies and progressively narrow the passband with the addition or more capacitance. The tuned passband lies within the static passband defined by the quarter-wavelength line. A single tank circuit at the antenna port can be used to frequency tune both the Tx and Rx ports or a pair of tank circuits can be used to independently tune the Tx and Rx ports. Transceiver units provided with frequency tunable Tx/Rx antenna switches can, for example, be used in a Master/Slave network in which multiple units communicate with each other or in an autonomous network in which each of the multiple units operate independently.

Figure 1:
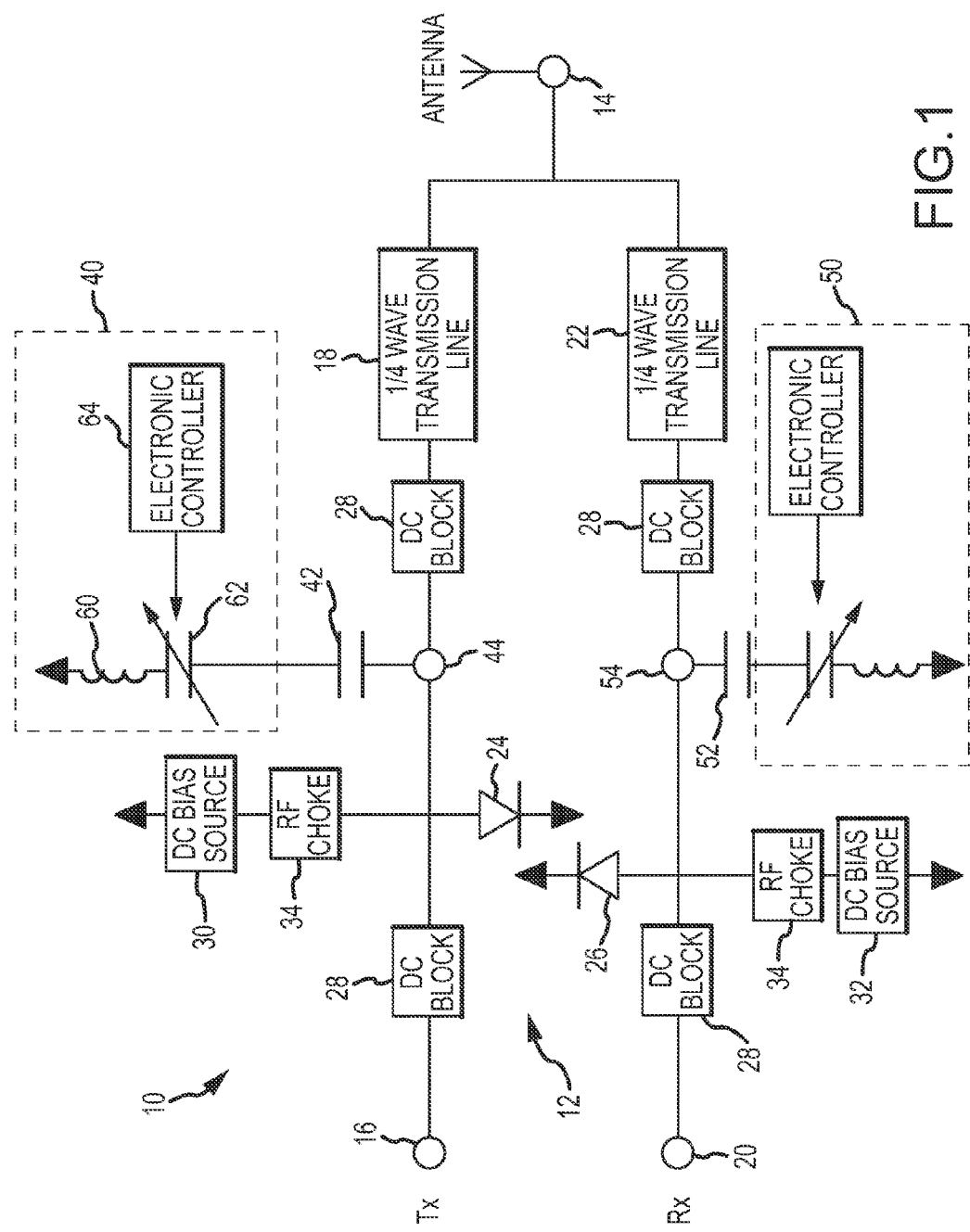
FIG. 1 is a diagram of an embodiment of a frequency tunable Tx/Rx antenna switch.

Referring now to the drawings, FIG. 1 is an embodiment of a frequency tunable Tx/Rx antenna switch 10 based on a tuned shunt single-pole double-throw (SPDT) PIN diode switch topology 12. An antenna port 14 is connected to a transmit port Tx 16 through a quarter-wavelength transmission line 18, and to a receive port Rx 20 through a quarter-wavelength transmission line 22. A PIN diode 24 is connected from the Tx port to a signal common (e.g. reference potential) and, similarly, a PIN diode 26 is connected from the Rx port to the signal common. DC Blocks 28 (e.g. a capacitor) provide DC isolation between the Tx port and the Rx port Controllable DC bias sources 30 and 32 apply respective bias voltages to diodes 24 and 26 to alternately forward and reverse bias the diodes. RE chokes 34 (e.g. an inductor) isolate the voltage sources from RE. The antenna port 14 is connected (ON) to the Tx port when diode 24 is reverse biased. Antenna port 14 is connected to Tx on 16 through the quarter-wavelength transmission line 18. The antenna port 14 is disconnected (OFF) to the Tx port when diode 24 is forward biased into a low impedance state. Antenna port 14 sees the quarter-wavelength line 18 plus an additional quarter-wavelength rotation, or open. Similarly, the antenna port 14 is connected (ON) to the Rx port when diode 26 is reverse biased. Antenna port 14 is connected to Rx port 20 through the quarter-wavelength transmission line 22. The antenna port 14 is disconnected (OFF) to the Rx port when diode 26 is forward biased into a low impedance state. Antenna port 14 sees the quarter-wavelength line 22 plus an additional quarter-wavelength rotation, or open.

in other embodiments the tunable Tx/Rx antenna switch may be configured as a single-pole multi-throw (SPMT) PIN diode switch topology to switch N transmit ports and M receive ports to the antenna port.

Figure 2A:
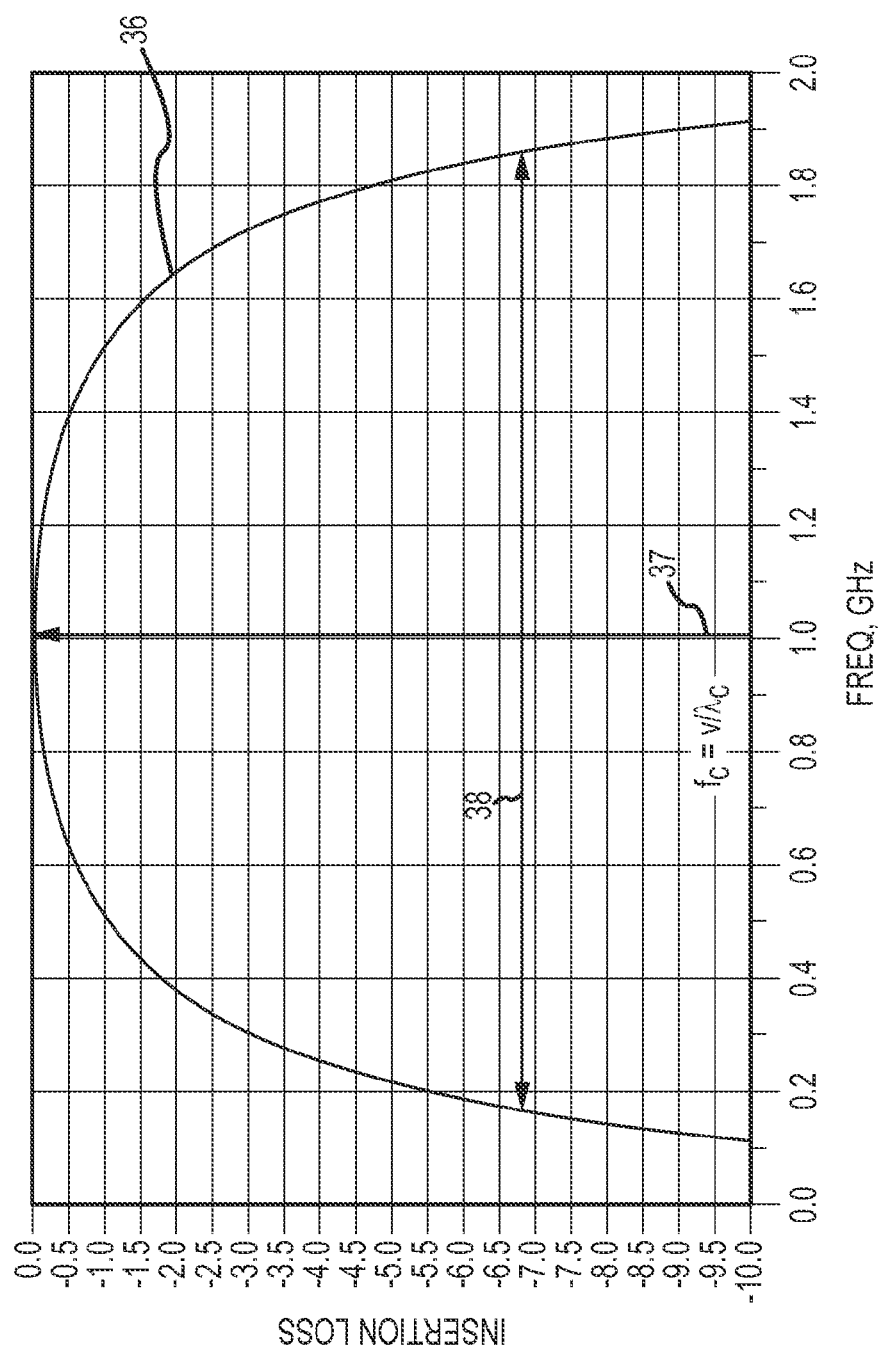
FIGS. 2a and 2b are plots of the insertion loss passband set by the ¼ wave transmission line and the progressive tuning of the center frequency to lower frequencies and narrower passbands with added capacitance.

As shown in FIG. 2a, the presence of the quarter-wavelength ($\lambda_c$) transmission lines 18 and 12 reduces the bandwidth of the switch to less than an octave. The transmission lines create a passband 36 (either transmit or receive) that is centered at center frequency fc 37 ($f_c=v/\lambda_c$ where v is the velocity of the RF waves in air) with a bandwidth 38. The transmission line may, for example, comprise an etched quarter-wavelength plate on a substrate. The transmission line's and Q determined the center frequency $f_c$ and the bandwidth 38 of passband 36. Once the quarter-wavelength line is etched passband 36 is fixed and static. In this example, the center frequency is at 1.0 GHz with a bandwidth of about 1.8 GHz.

Referring again to FIG. 1, in this embodiment an electronically tunable solid-state LC tank circuit 40 is a capacitively coupled via a capacitor 42 to a tuning port 44 on the transmit leg of the switch and an electronically tunable LC tank circuit 50 is a capacitively coupled via a capacitor 52 to a tuning port 54 on the transmit leg of the switch. In some transceiver units, it may be necessary or preferable to provide frequency tuning of both transmit and receiver passbands. Transmit and receive pnssbands may be tuned to the same or different frequencies. In other transceiver units, frequency tuning of only the transmit passband may be required.

The electronically tunable solid-state LC tank circuits 40 and 50 each comprise a series connected fixed inductor 60 and electronically-controlled variable capacitor 62 and an electronic controller 64 to set the capacitance value. The series connected LC circuit and electronic controller are each connected to the signal common. The LC tank circuit comprises only electronic components such as an inductor, variable capacitor (e.g. a varactor diode, or electronically-switched capacitor bank.) and a DC voltage source. The tank circuit does not include mechanical components such as MEMS switches or a Yttrium Iron Garnet (YIG) sphere. Electronic tuning of the Tx/Rx antenna switch is both inexpensive and reliable.

In one embodiment, the variable capacitor may be a varactor diode whose capacitance changes with reverse bias voltage. The electronic controller comprises a series-connected controllable DC voltage source and RF choke that are connected in parallel with the LC network. The RF choke decouples RF at the antenna or transmit ports from the DC voltage source. In another embodiment, the variable capacitor may be a switched capacitor bank. The electronic controller selectively opens and closes switches to the capacitor bank to set the capacitance value. In either case, a single tuning voltage can be used to tune a passband. In the former case, a single tuning voltage controls the bias conditions of the varactor to adjust its capacitance. In the latter case, a single tuning voltage can determine which switches to open and close.

Figure 2B:
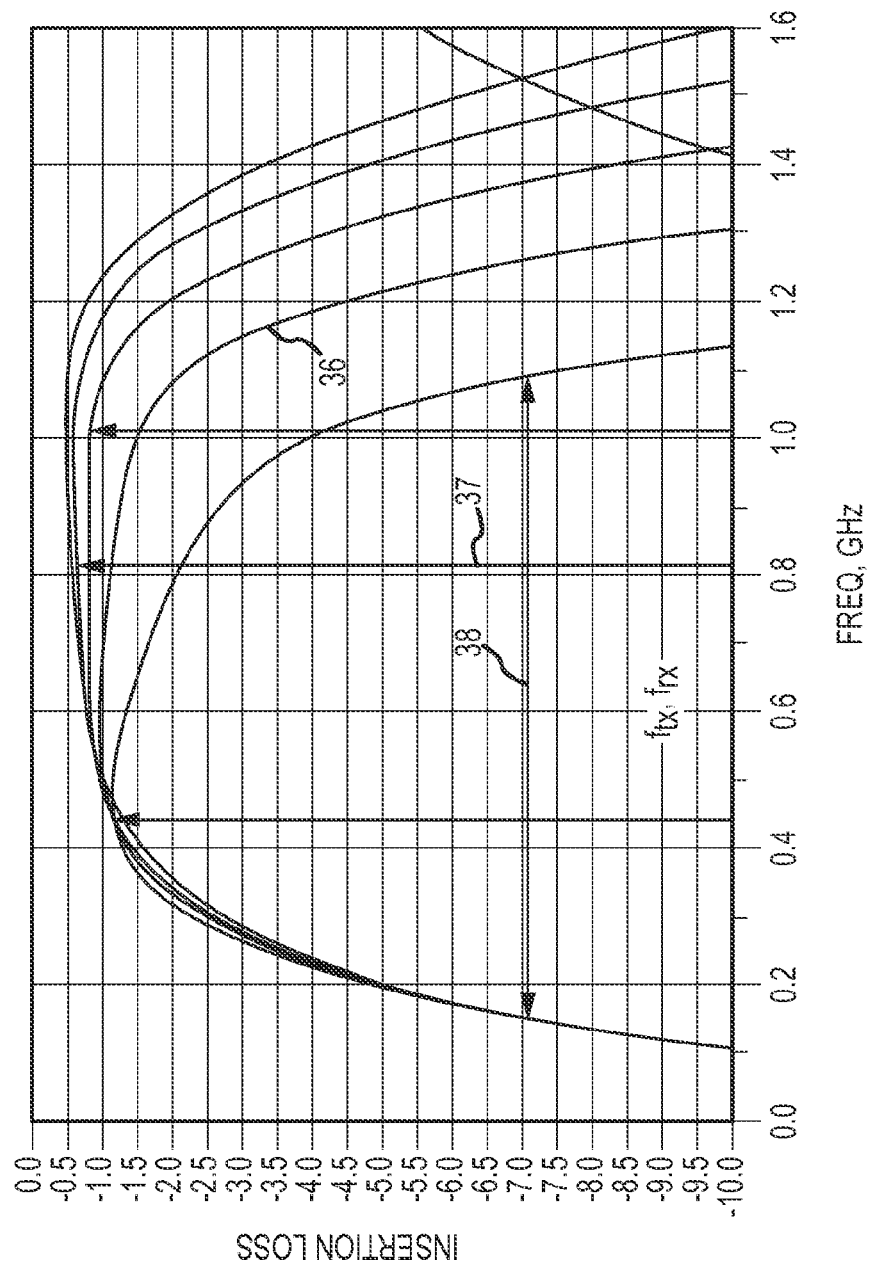

The electronically tunable LC tank circuit couples an impedance to the switch. As shown in FIG. 2b, the addition of the impedance, particularly the capacitance, rejects higher frequencies in the passband 36 established by the quarter-wavelength transmission line. As more capacitance is added, more high frequencies are rejected. This causes the passband 36 to shift to lower and lower center frequencies $f_{tx}$ for transmit and $f_{rx}$ for receive and to progressively narrow. In a transceiver, the transmitter may be designed to transmit at a fixed frequency corresponding to the lower center frequency $f_{tx}$ of the timed circuit. For example, the transmit frequency may corresponding to 450 MHz in which the original center frequency was 1 Hz. Alternately, the transmitter may be able to tune its transmit frequency based on the frequency $f_{tx}$ of the tuned circuit. In either case, the transmit frequency $f_{tx}$ will be lower than the center frequency $f_c$ of the initial fixed passband established by the quarter-wavelength transmission line.

Figure 3:
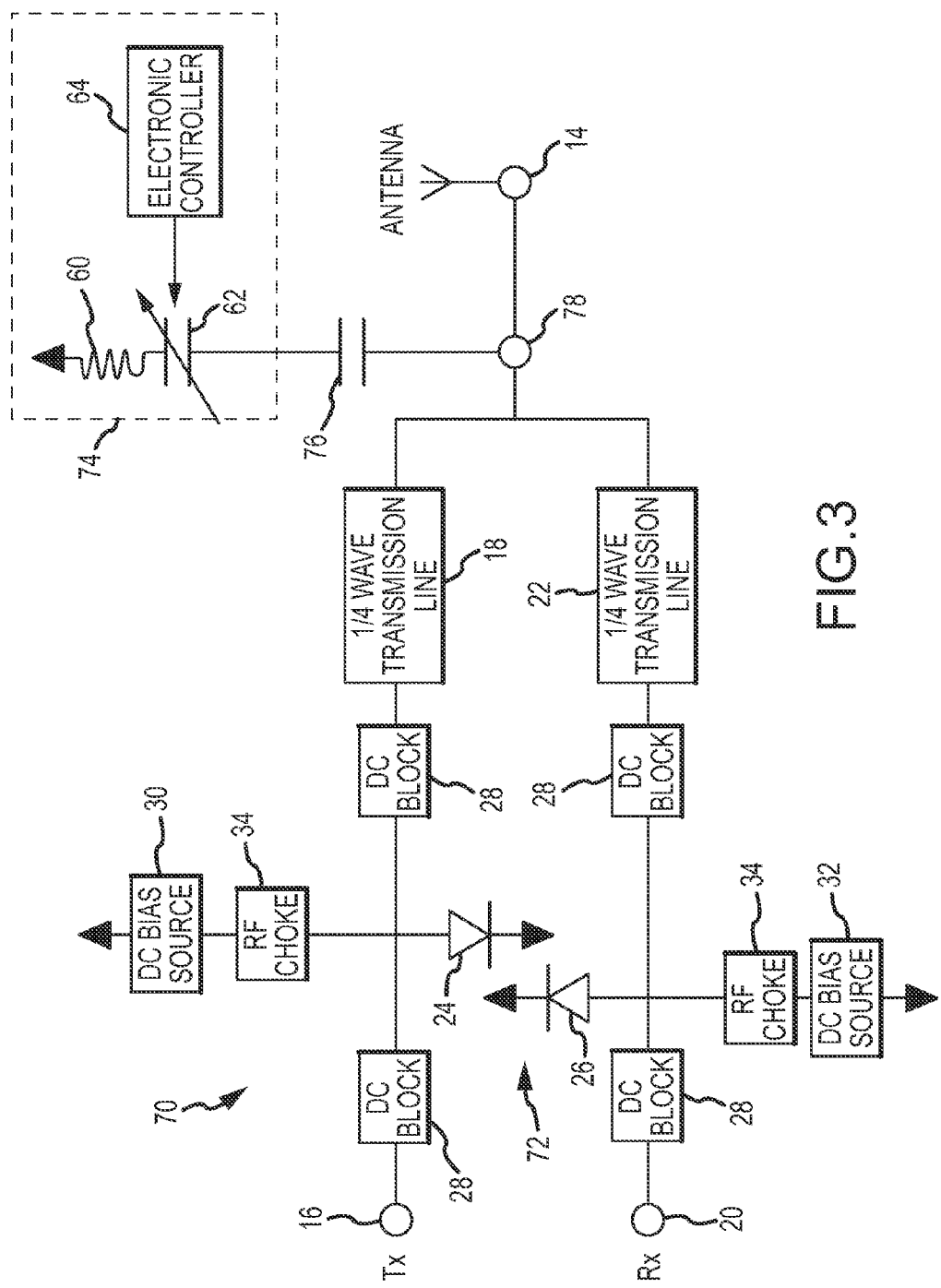
FIG. 3 is a diagram of another embodiment of a frequency tunable Tx/Rx antenna switch.

Referring now to the drawings, FIG. 3 is another embodiment of a frequency tunable Tx/Rx antenna switch 70 based on a tuned shunt single-pole double-throw (SPDT) PIN diode switch topology 72. The SPDT PIN diode switch 72 that connects Tx and Rx ports 16 and 20 to antenna port 14 is the same as is illustrated in FIG. 4. In this embodiment, a single electronically tunable solid-state LC tank circuit 74 is coupled via coupling capacitor 76 to a tuning port 78 between the PIN diode switch 72 and antenna port 14 to tune the passband of the Tx or Rx port that is connected to the antenna port. When the PIN diode switch is biased to connect the Tx port to the antenna port, the LC tank circuit 74 is electronically controlled to couple an impedance to narrow the passband to a desired transmit passband. When the PIN diode switch is biased to connect the Rx port to the antenna port, the LC tank circuit 74 is electronically controlled to set a desired receive passband. In different applications, the LC tank circuit may add minimal or no impedance to the switch so that the passband remains at or near its original frequency and bandwidth. In other applications, the LC tank circuit may add the same impedance as the Tx case so that the Tx and Rx passbands are approximately equal.

Figure 4B:
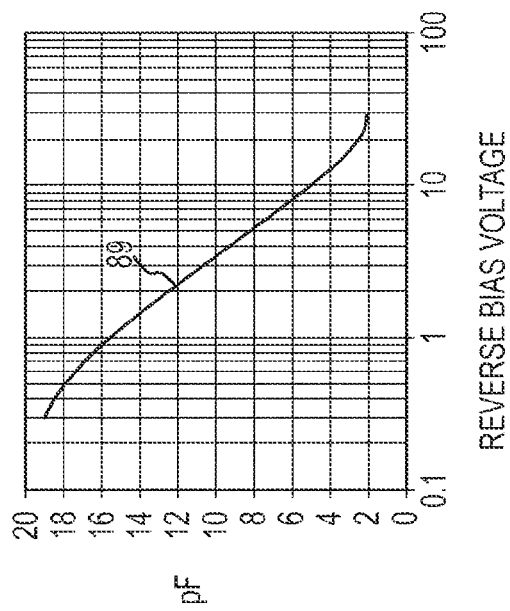
FIGS. 4a and 4b are a diagram of a varactor-tuned LC tank circuit and a plot of varactor diode capacitance vs. reverse voltage.
Figure 4A:
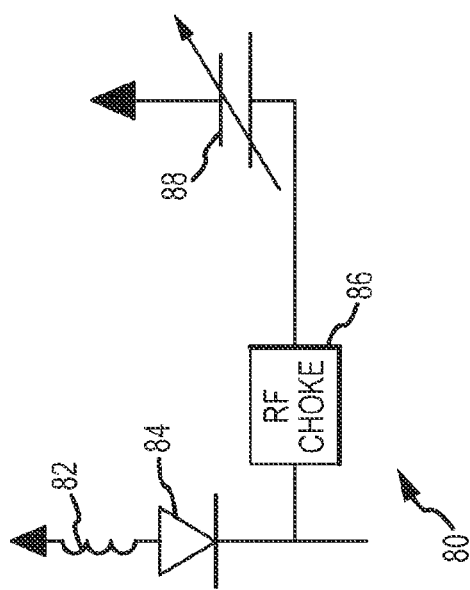

Referring now to FIGS. 4a and 4b, an embodiment of an electronically tunable solid-state LC tank circuit 80 comprises a parallel structure of a series-connected fixed inductor 82 and a varactor diode 84 and a series-connected RF choke 86 and controllable voltage source 88. The voltage source is responsive to a tuning signal to set the voltage across varactor diode 84 and adjust its capacitance. As shown in FIG. 4b, the capacitance 89 of the varactor is a maximum when a minimum reverse bias voltage is applied. The capacitance decreases as the reverse bias voltage increases. The impedance of the LC circuit, and particular this capacitance is coupled to the PIN diode switch. The addition of capacitance suppresses high frequencies in the fixed passband set by the quarter-wavelength line to effectively shift the center frequency and narrow the passband. As more capacitance is added, the center frequency continues to shift to lower frequencies and exhibit a progressively narrower passband. In an embodiment, the capacitance of the PIN diode is the smallest, typically about 1 pF maximum. The coupling capacitance may have a capacitance of about 3 pF at the center frequency of the fixed passband, around 1 GHz. The tuning capacitance may range from about 2-20 pF.

Transceiver units provided with frequency tunable Tx/Rx antenna switches can, for example, be used in a Master/Slave network in which multiple units communicate with each other or in an autonomous network in which each of the multiple units operate independently. The frequency tenability provided by the electronically tunable LC tank circuit provides for isolation between transmit and receive bands or different units to avoid interference. The frequency tunable Tx/Rx antenna switch may be used in transceiver units such as wireless RF (e.g. cell phones), manufacturing control systems, medical diagnostic systems, auto diagnostics, automobiles, cars, modems, missiles, surveillance, home electronics control systems and robotics.

Figure 5A:
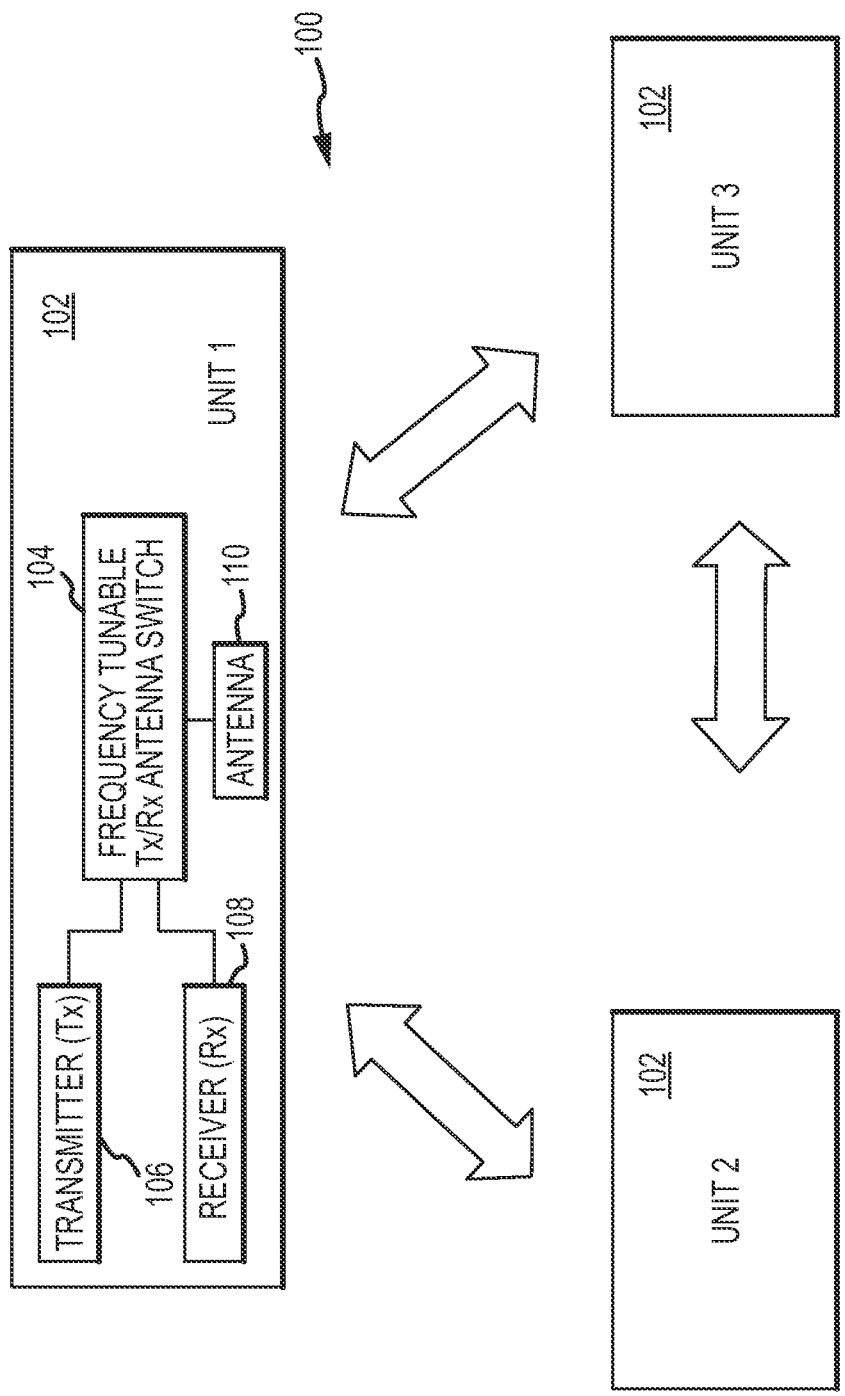
FIGS. 5a and 5b are diagrams of three units having the same frequency tunable Tx/Rx antenna switch and the passband to facilitate communication among the units in a Master/Slave network.
Figure 5B:
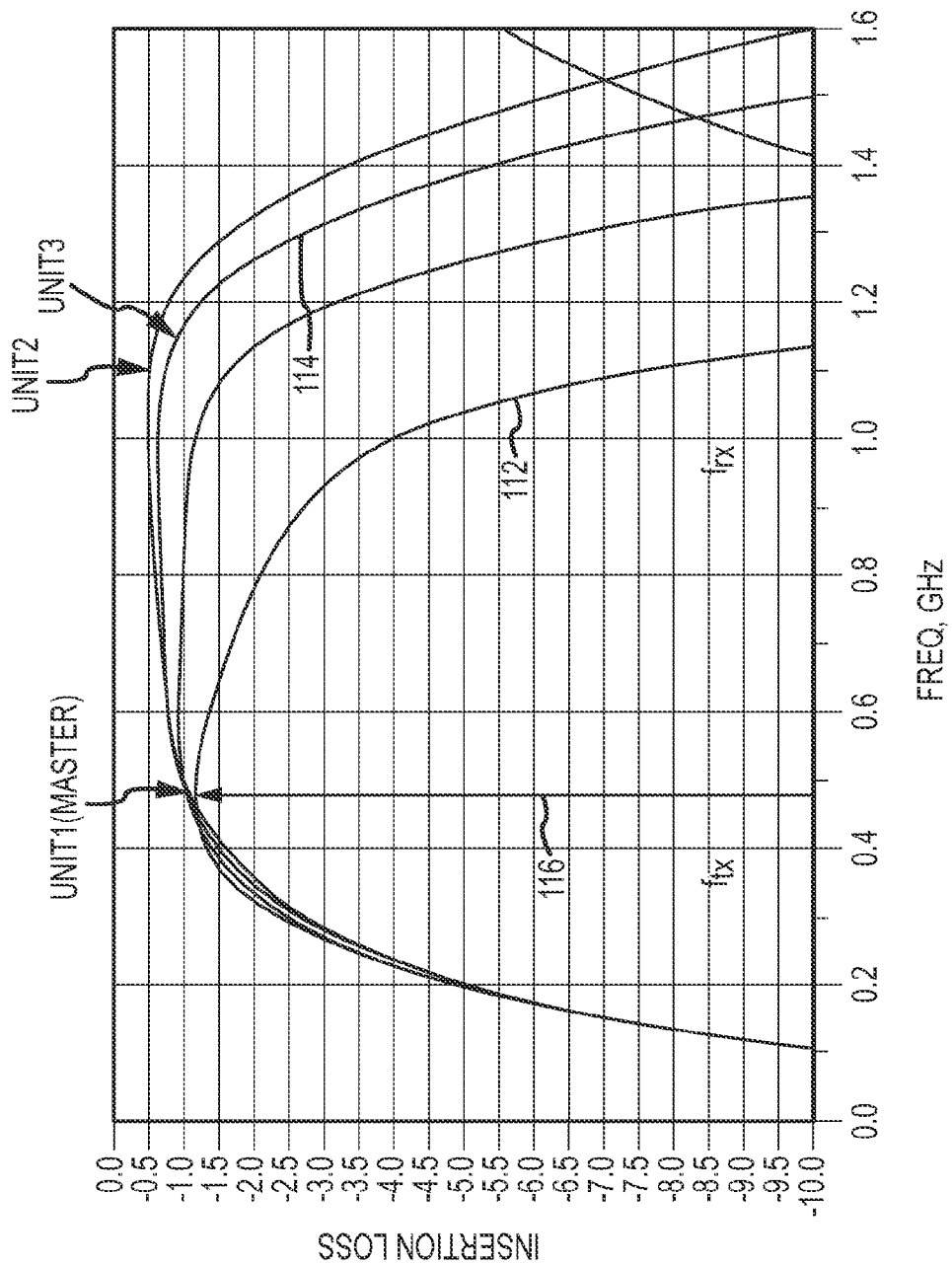

Referring now to FIGS. 5a-5b. a Master/Stave network 100 includes multiple transceiver units 102 that communicate with each other using RF communications. All three units (Unit 1, Unit 2 and Unit 3) include the same tunable Tx/Rx switch 104 that connects a transmitter 106 and a receiver 108 to an antenna 110. In the most general case, both transmit and receive passbands are tunable. However, in some cases the receive passband may remain static at the passband set by the quarter-wavelength transmission line. At any given time one unit is the designated Master and the remaining units are Slaves. The Master transmits a signal that is received by each of the Slaves. The Master controls its LC tank circuit to add capacitance to tune the switch to its narrowest passband 112 at frequency $f_{tx}$. The Slaves control their respective LC tank circuits to add minimal or now capacitance to maintain a wide passband 114. The Master can become a Slave and vice-versa by simply changing the passband. By transmitting in the narrow band, the Master unit does not interfere with Unit 1 or 2 (listening/receiving units') passband, since it has approximately 10 dB attenuation on the receive (Rx) frequency channels of units 1/2. This attenuation attenuates the noise and harmonics associated with transmission frequency 116.

Figure 6B:
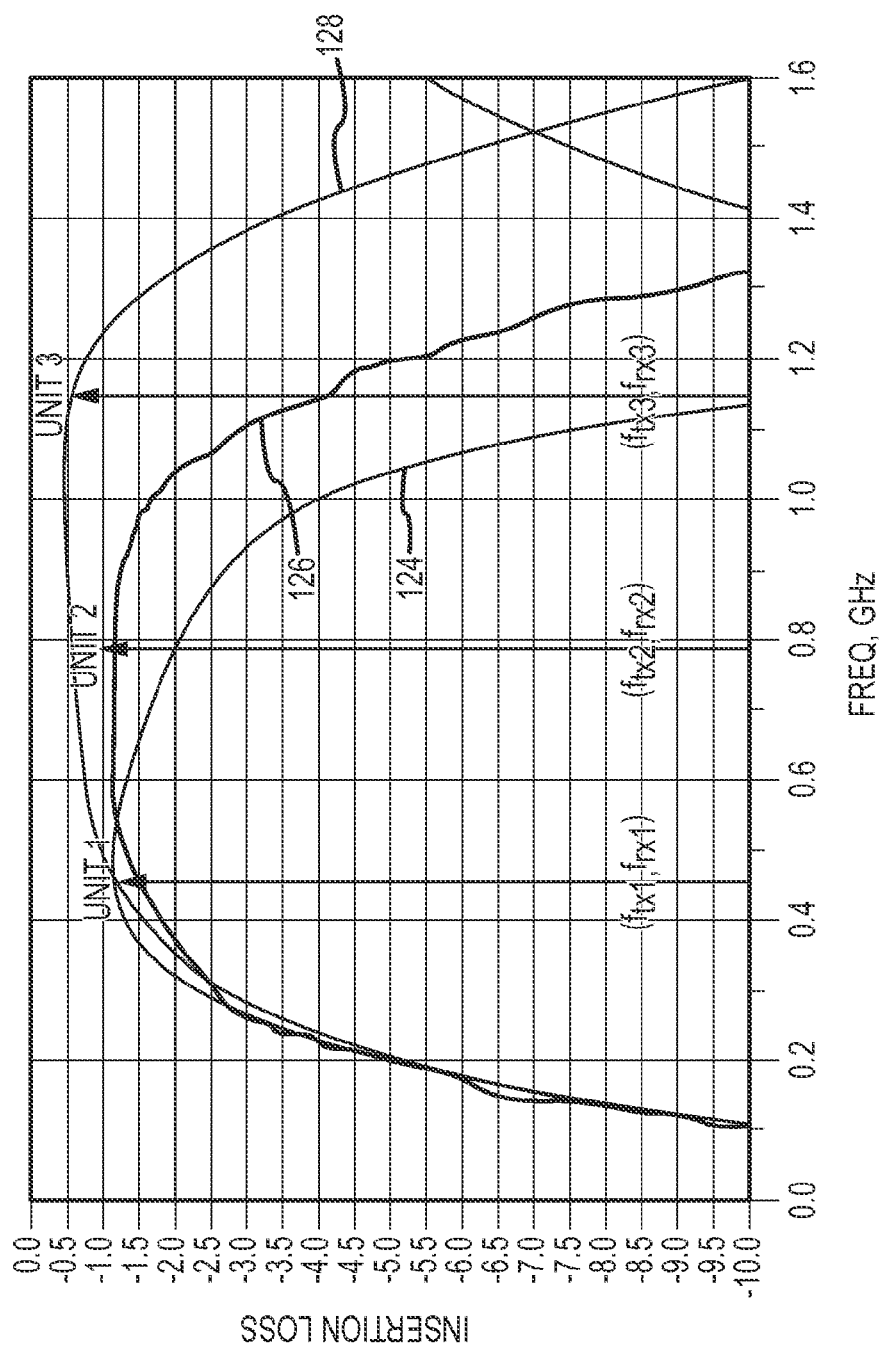

Referring now to FIGS. 6a-6b, an autonomous network 120 includes multiple transceiver writs 122 that operate (transmit and receive using RF communications) independently of each other without interference. In this example, Unit 1, Unit 2 and Unit 3 (robots, cars, modems, Transceivers (Tx+Rx), etc.) co-exist without interference. Both transmit and receive ports are tuned by a quarter-wavelength line and coupled to a tunable LC tank circuit to tune transmit and receive passbands. Each unit's transmit and receive passbands 124, 126, and 128 are tuned to a different shifted center frequency. For example, unit 1 is tuned to 0.5 GHz ($f_{tx1}, f_{rx1}$) and unit 2 is tuned to 0.8 GHz ($f_{tx2}, f_{rx2}$) and unit 3 is tuned to 1.1 GHz ($f_{tx3}, f_{rx3}$). Units at relatively lower center frequencies (narrower passbands) will attenuate the noise of their transmissions as seen by units at higher center frequencies (wider passbands). Similarly units at relatively lower center frequencies (narrower passbands) will attenuate the noise of transmission units at higher center frequencies (wider passbands). The overall effect is to isolate the transmission and reception of the N transceiver units to avoid interference.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A frequency tunable transmit/receive (Tx/Rx) antenna switch, comprising:
   an antenna port;
   a receive port;
   a transmit port;
   a tuned PIN diode RF switch that alternately connects the receive and transmit ports to the antenna port, said switch including at least a first quarter-wavelength ($\lambda_c/4$) transmission line to increase isolation between the transmit port and the antenna port, said switch exhibiting an initial transmission passband centered about an initial center frequency $f_c$ with an initial bandwidth set by said quarter-wavelength transmission line;
   a first tuning port on said RF switch;
   as first electronically tunable solid-state LC tank circuit, said LC tank circuit comprising a parallel structure of a series-connected fixed inductor and voltage-controlled capacitor and an electronic controller that applies a voltage to the voltage-controlled capacitor to set a capacitance value and adjust a circuit impedance of the LC tank circuit; and
   a coupling structure that couples the LC tank circuit and its circuit impedance to the first tuning port,
   said LC tank circuit adding capacitance to the switch to shift center frequency $f_c$ of a tuned transmission passband to a lower tuned frequency $f_{tx}$ and narrower tuned bandwidth.

2. The frequency tunable Tx/Rx antenna switch of claim 1, wherein the tuned transmission passband lies wholly within the initial transmission passband set by the quarter-wavelength transmission line.

3. The frequency tunable Tx/Rx antenna switch of claim 2, wherein said transmit port receives an RF transmit signal that is tuned to the lower tuned frequency $f_{tx}$.

4. The frequency tunable Tx/Rx antenna switch of claim 1, wherein said transmission passband is tunable over a range of frequencies $f_{tx}$ and bandwidths in response to the applied voltage, said tuned transmission band having the lowest tuned frequency $f_{tx}$ and narrowest transmit passband within that range.

5. The frequency tunable Tx/Rx antenna switch of claim 1, wherein said voltage-controlled capacitor comprises a reverse biased varactor diode, said electronic controller comprises a series-connected RE choke and controllable voltage source in parallel with the series connected inductor and capacitor, said controllable voltage source responsive to a tuning signal to vary a reverse bias voltage across the varactor diode to set its capacitance value.

6. The frequency tunable Tx/Rx antenna switch of claim 1, wherein the tuned PIN diode RF switch is a single-pole double-throw switch.

7. The frequency tunable Tx/Rx antenna switch of claim 1, further comprising at least a second transmit port or a second receiver port, wherein the tuned PIN diode RF switch is a single-pole multi-throw switch.

8. The frequency tunable Tx/Rx antenna switch of claim 1, wherein the tuned PIN diode RF switch comprises a shunt, series or series-shunt connected PIN diode to switch each of said receive and said transmit ports.

9. The frequency tunable Tx/Rx antenna switch of claim 1, wherein said switch comprises a second quarter-wavelength ($\lambda_c/4$) transmission line to increase isolation between the receive port and the antenna port, said switch exhibiting an initial receive passband centered about the initial center frequency $f_c$ with the initial bandwidth set by said quarter-wavelength transmission line.

10. The frequency tunable Tx/Rx antenna switch of claim 9, wherein said receive passband is static and not tuned.

11. The frequency tunable Tx/Rx antenna switch of claim 9, wherein said first electronically tunable solid-state LC tank circuit is connected at the first tuning port between said PIN diode switch and said antenna port, said LC tank circuit being electronically tuned to the tuned transmission band and frequency $f_{tx}$ when the transmit port is connected to the antenna port and being electronically tuned to a tuned receive band and a frequency $f_{rx}$ when the receive port is connected to the antenna port.

12. The frequency tunable Tx/Rx antenna switch of claim 9, wherein said first tuning port couples said first electronically tunable solid-state LC tank circuit to only said first quarter-wavelength transmission line and said transmit report, further comprising:
   a second tuning port to said second quarter-wavelength transmission line and said receive port,
   a second electronically tunable solid-state LC tank circuit, said LC tank circuit comprising a parallel structure of a series-connected fixed inductor and voltage-controlled capacitor and an electronic controller that applies a voltage to the voltage-controlled capacitor to set a capacitance value and adjust a circuit impedance of the LC tank circuit; and
   a second coupling structure that couples the second LC tank circuit and its circuit impedance to the second tuning port,
   said LC tank circuit adding capacitance to the switch to shift center frequency $f_c$ of a tuned receive passband to a lower tuned frequency $f_{rx}$ and narrower tuned bandwidth.

13. A frequency tunable transmit/receive (Tx/Rx) antenna switch, comprising:
   an antenna port;
   a receive port;
   a transmit port;
   a tuned single-pole double-throw PIN diode RF switch that alternately connects the receive and transmit ports to the antenna port, said switch comprising:
      a first leg connected between the antenna port and the transmit port, said first leg including a shunt-connected PIN diode, a quarter-wavelength ($\lambda_c/4$) transmission line between the PIN diode and the antenna port and a DC bias network responsive to as switch signal to bias the PIN diode to connect or disconnect the transmit port to the antenna port, said switch exhibiting an initial transmission passband centered about an initial center frequency $f_c$ with an initial bandwidth set by said quarter-wavelength transmission line when connected; and
      a second leg connected between the antenna port and the receive port, said first leg including a shunt-connected PIN diode, a one-quarter wavelength ($\lambda_c/4$) transmission line between the PIN diode and the antenna port and a DC bias network responsive to a switch signal to bias the PIN diode to connect or disconnect the receive port to the antenna port, said switch exhibiting an initial receive passband centered about the initial center frequency $f_c$ with the initial bandwidth set by said quarter-wavelength transmission line when connected;
   one or more tuning ports on said RF switch;
   one or more electronically tunable solid-state LC tank circuits, each said LC tank circuit comprising a parallel structure of a series-connected fixed inductor and a varactor diode and a series-connected RF choke and controllable voltage source, said voltage source responsive to a tuning signal to vary the voltage across the varactor diode to set its capacitance and adjust a circuit impedance of the LC tank circuit; and one or more coupling structures that couple the one or more LC tank circuits to the one or more tuning ports, said one or more LC tank circuits adding capacitance to the switch to shift center frequency fc to lower a lower transmit frequency $f_{tx}$ and narrow the transmission passband when the switch connects the transmit port to the antenna port and adding capacitance to the circuit impedance to shift center frequency $f_c$ to a lower receive frequency $f_{rx}$ and narrow the receiver passband when the switch connects the receive port to the antenna port.

14. The frequency tunable Tx/Rx antenna switch of claim 13, wherein the tuned transmission passband and receive passband each lie wholly within the initial transmission passband set by the quarter-wavelength transmission line.

15. The frequency tunable Tx/Rx antenna switch of claim 13, wherein said transmit port receives an RF transmit signal that is tuned to the lower tuned frequency $f_{tx}$.

16. The frequency tunable Tx/Rx antenna switch of claim 13, wherein only one said LC tank circuit is coupled to a tuning port between the tuned single-pole double-throw PIN diode RF switch and the antenna port, said LC tank circuit tuning the transmission passband when the transmit port is connected to the antenna port and tuning the receive passband when the receive port is connected to the antenna port.

17. A system of a plurality of transceiver units, each unit comprising:

an antenna coupled to an antenna port;

a receiver coupled to a receive port;

a transmitter coupled to a transmit port;

a tuned single-pole double-throw PIN diode RF switch that alternately connects the receive and transmit ports to the antenna port, said switch including at least a first quarter-wavelength ($\lambda_c/4$) transmission line to increase isolation between the transmit port and the antenna port, said switch exhibiting an initial transmission passband centered about an initial center frequency $f_c$ with an initial bandwidth set by said quarter-wavelength transmission line;

a tuning port on said RF switch; and an electronically tunable solid-state LC tank circuit, said LC tank circuit comprising a parallel structure of a series-connected fixed inductor and voltage-controlled capacitor and an electronic controller that applies a voltage to the voltage-controlled capacitor to set a capacitance value and adjust as circuit impedance of the LC tank circuit; and a coupling structure that couples the LC tank circuit and its circuit impedance to the tuning port, said LC tank circuit adding capacitance to the switch to shift center frequency $f_c$ of a tuned transmission passband to a lower tuned transmit frequency $f_{tx}$ and narrower tuned bandwidth.

18. The system of claim 17, wherein the transceiver units communicate with each other in a Master/Slave network in which one said unit is the Master that transmits an RF signal at $f_{tx}$ and the remaining units are Slaves that receive the RF signal, said Master unit tuning its transmission passband to the lower tuned frequency $f_{tx}$ and narrower tuned bandwidth.

19. The system of claim 17, wherein first and second said transmission units operate in an autonomous network without interference from each other, each said unit comprises a second quarter-wavelength ($\lambda_c/4$) transmission line to increase isolation between the receive port and the antenna port, an initial receive passband centered about the initial center frequency $f_c$ with the initial bandwidth set by said quarter-wavelength transmission line and an electronically tunable solid-state LC tank circuit that adds capacitance to the switch to shift center frequency $f_c$ of a tuned receive passband to a lower tuned receive frequency $f_{rx}$ and progressively narrower tuned bandwidth, said first transceiver unit tuning its transmit and receive frequencies $f_{tx}$ and $f_{rx}$ to a first frequency; and said second transceiver unit tuning its transmit and receive frequencies $f_{tx}$ and $f_{rx}$ to a second frequency, said second frequency being a higher frequency than said first frequency.

* * * * *